Figure 6:
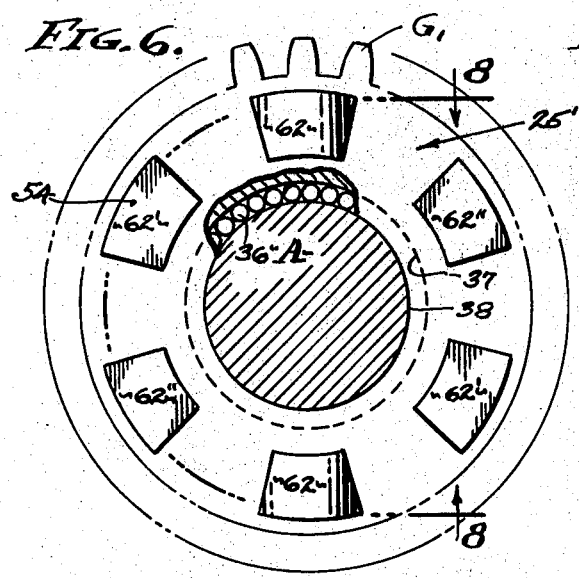

United States Patent

[11] 3,550,738

| [72] | Inventor | Henry T. Halibrand |
| | | 6469 Nancy St., Los Angeles, Calif. 90045 |
| [21] | Appl. No. | 770,554 |
| [22] | Filed | Oct. 25, 1968 |
| [45] | Patented | Dec. 29, 1970 |

[54] SPEED SYNCHRONIZING JAW CLUTCH
15 Claims, 13 Drawing Figs.

[52] U.S. Cl. .................................................... 192/53,
192/67, 192/108
[51] Int. Cl. ........................................................F16d 23/10,
F16d 11/10
[50] Field of Search........................................... 192/53, 67,
108; 74/339

[56] References Cited
UNITED STATES PATENTS

| 874,419 | 12/1907 | McKeen, Jr. ................. | 192/108 |
| 1,009,990 | 11/1911 | Norton......................... | 192/67 |
| 1,746,764 | 2/1930 | Carhart........................ | 192/108(X) |
| 1,757,414 | 5/1930 | Collins ......................... | 192/108(X) |
| 2,220,463 | 11/1940 | Sinclair ........................ | 192/67 |
| 2,384,584 | 9/1945 | Wildhaber.................... | 192/108(X) |
| 2,535,388 | 12/1950 | Burks et al................... | 192/108(X) |

Primary Examiner—Allan D. Herrmann
Attorney—William H. Maxwell

ABSTRACT: This invention provides a jaw clutch with dogs that are capable of shifting into and out of gear without the necessity of reducing rotational speeds, the angular velocity of the clutch elements being brought into synchronization by virtue of frictional engagement momentarily prior to positive interengagement of the dogs. The above functions are accomplished by means of cam-shaped interface engagement between the opposed dogs of the two clutch elements which are otherwise of what would appear to be a usual configuration. However, fragile corners are eliminated and there are unique inclined planes leading to frictional interengagement of opposed dog faces prior to the positive interengagement of the dogs. And high angular velocities are provided for by means of circumferentially spaced and stepped dogs of decreasing axial extent which follow in rotation the dogs having said frictional interengagement.

PATENTED DEC 29 1970
3,550,738
SHEET 1 OF 2
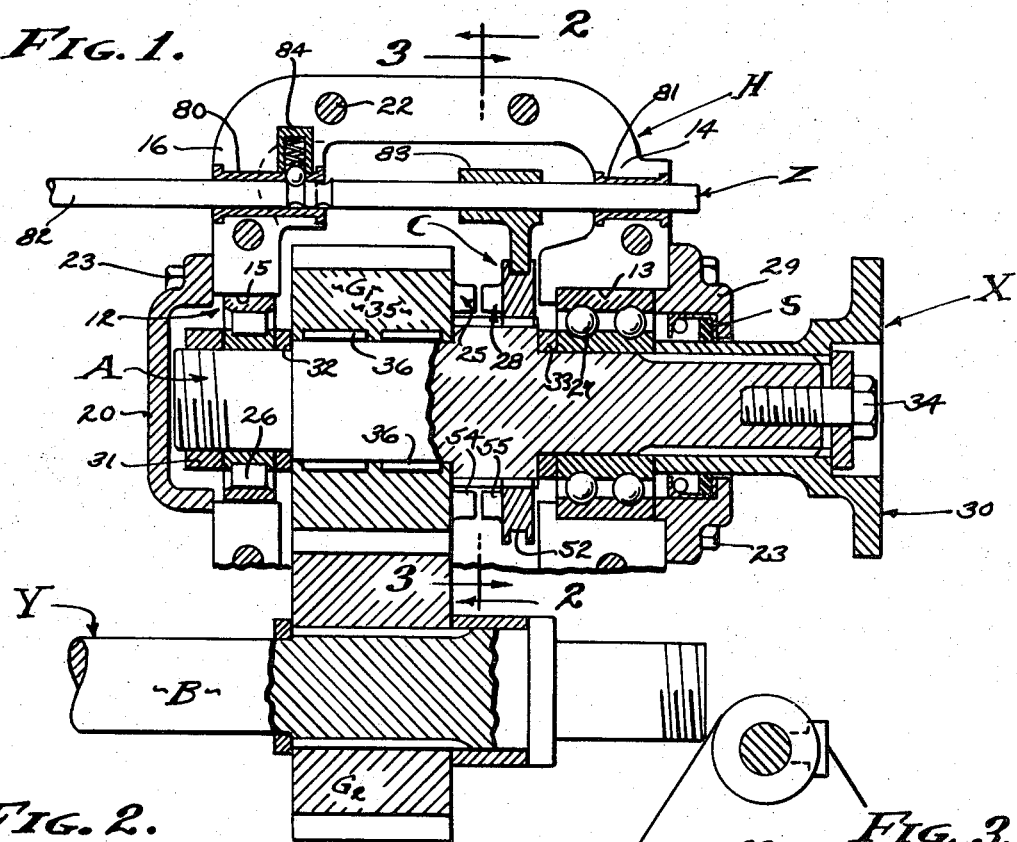
Fig.1.
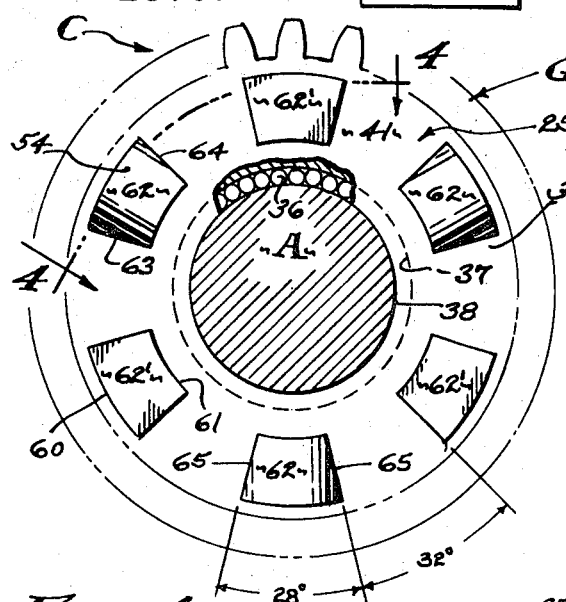
Fig.2.
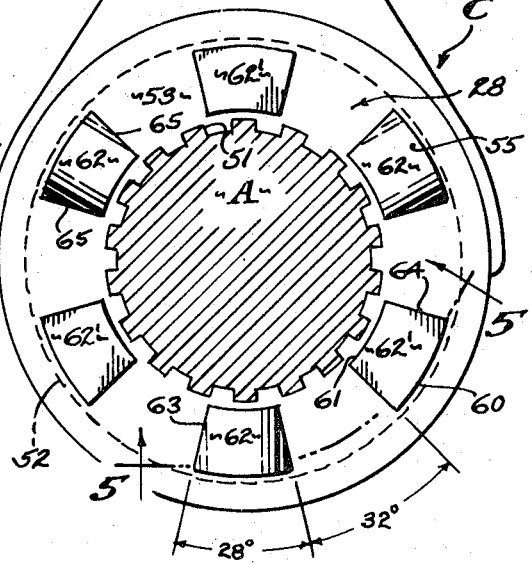
Fig.3.
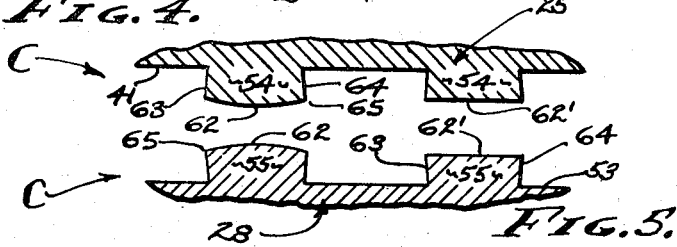
Fig.4.
Fig.5.
INVENTOR.
HENRY T. HALIBRAND
BY
W. H. Maxwell
AGENT

PATENTED DEC 29 1970

3,550,738

SHEET 2 OF 2

INVENTOR.
HENRY T. HALIBRAND
BY
W. H. Maxwell
AGENT

SPEED SYNCHRONIZING JAW CLUTCH

Transmissions of all types, and particularly those where gearing is involved, require the engagement and disengagement of relatively rotatable parts. That is, one shaft is required to be rotationally disengageable with another and to this end various types of clutches have been resorted to including, for example, the basic jaw clutches of many machines and the more refined synchromesh clutches of automotive transmissions and the like. There are of course special types of clutches involving friction discs and drive pins, etc. but it is primarily the direct coupling jaw type clutch with which the present invention is concerned, it being a general object of this invention to provide means in a jaw type clutch which synchronizes rotation of two rotatable elements which are then shiftable into positive driving engagement one with the other. In other words, the object herein is to permit shifting of two jaw clutch elements into positive interengagement with automatic establishment of the same speed, or substantially so, of rotation in said two elements before the shift is completed.

The prior art jaw clutches of the type under consideration are of limited utility in that no provision is made therein for synchronization of the two jaw-shaped elements that are ultimately brought into positive interengagement. Therefore, the usual clutch of this type must be brought to a rotational halt or nearly so (or the equivalent with respect to relatively rotating parts) before engagement can be effected; due to the physical impossibility of interengaging two elements revolving at differing angular velocities. However, if the difference in angular velocity is substantially eliminated it becomes possible to effect a shift into engagement of two such jaw elements, but with the risk of damage in the event that angular velocities are not sufficiently synchronized as caused by shock when the clutch elements suddenly engage or as caused by shearing when there is the inability to completely interengage. Consequently, the use of ordinary clutches is limited and the much complicated synchromesh clutches are resorted to, it being an object of this invention to provide all of the advantages of a synchromesh clutch with all of the simplicity and advantages and efficiency of a jaw clutch. With the present invention there are simply two jaw elements characterized by circumferentially spaced axially projecting dogs that interengage with each other respectively, and it is these two elements which frictionally engage and synchronize angular velocities momentarily before shifting into positive interengagement.

It is an object of this invention to produce a dog configuration in a jaw clutch of the type under consideration wherein friction is established between the interfacial engagement of the dogs when angular velocity is at variance between the two clutch elements, and which then permits shifting into full interengagement when the angular velocities are in substantial accordance with each other. It is to be understood that angular velocity accordance, or synchronism, need not be exacting and that a discrepancy in this respect is tolerable in actual practice.

It is still another object of this invention to provide a jaw clutch of the type under consideration which enables a slipping action or frictional engagement that precedes positive engagement and that provides substantial lead and/or angular displacement between said frictional and positive engagements. With the present invention there is substantial angular displacement between said two engagements, and depending upon the forms of the invention as they are hereinafter described said displacement can vary greatly from the circumferential extent of one dog to a nominal 180°, as may be desired.

It is still another object of this invention to provide a jaw clutch of the type under consideration wherein the full interengagement is self-locking and the clutch elements not subject to displacement when torque is applied under driving conditions. In practice a limited amount of backlash is tolerable and which occurs in the dog interengagement to enhance the engagement facility.

The various objects and features of this invention will be fully understood from the following detailed description of the typical preferred forms and applications thereof, throughout which description reference is made to the accompanying drawings, in which:

FIG. 1 is a longitudinal sectional view taken through the jaw clutch portion of a typical transmission embodying the present invention.

FIGS. 2 and 3 are enlarged views of the jaw clutch elements on the driving shaft and taken as indicated by lines 2–2 and 3–3 on FIG. 1.

FIGS. 4 and 5 are detailed fragmentary views taken as indicated by lines 4–4 and 5–5 on FIGS. 2 and 3 respectively.

Figure 7:
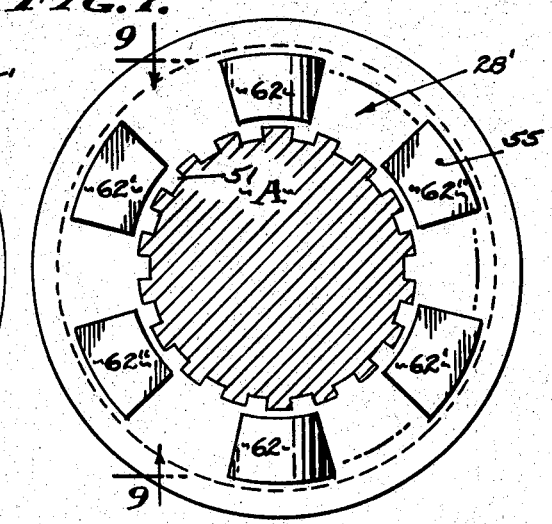

FIGS. 6 and 7 are similar to FIGS. 2 and 3 and show a second form of the invention.

Figure 8:
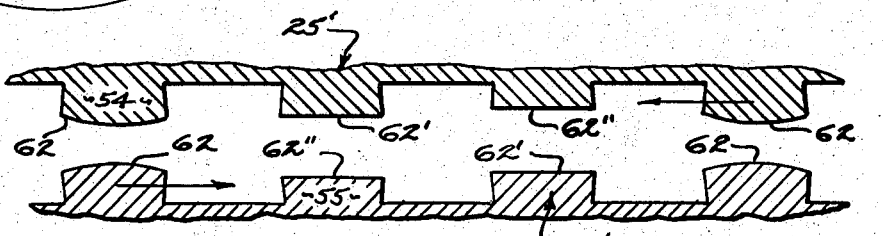
Figure 9:

FIGS. 8 and 9 are detailed fragmentary views taken as indicated by lines 8–8 and 9–9 on FIGS. 6 and 7 respectively.

Figure 10:
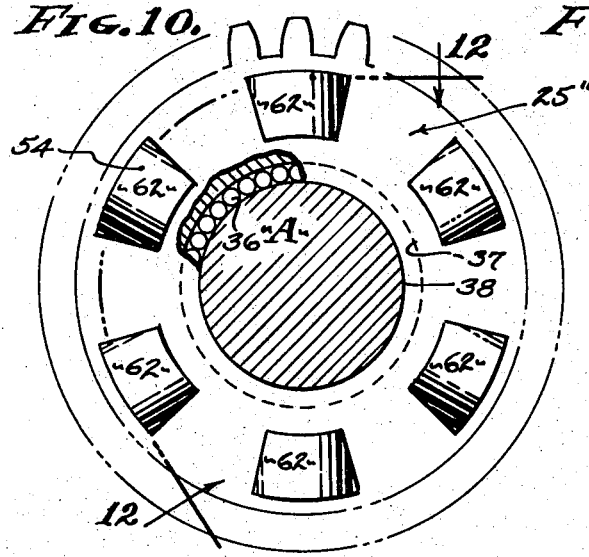
Figure 11:
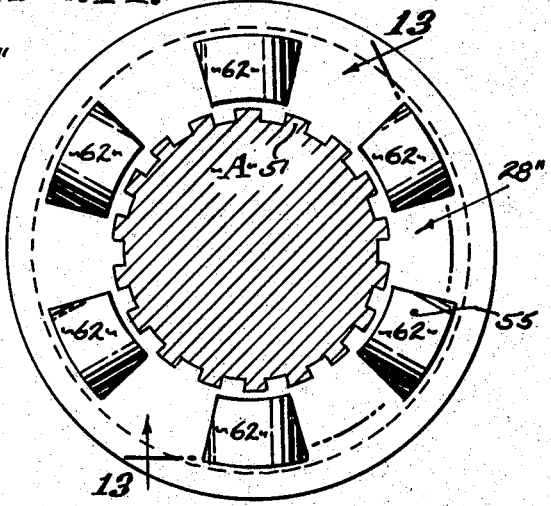
Figure 12:
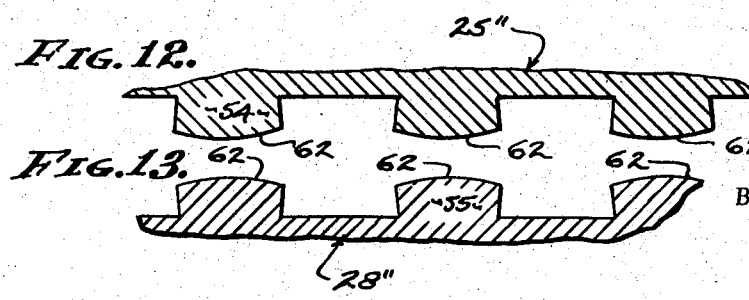
Figure 13:
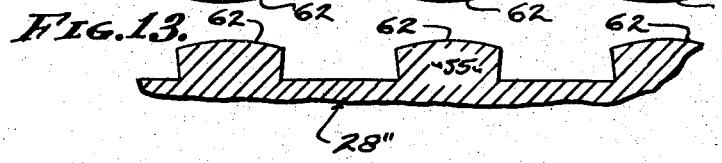

FIGS. 10 and 11 are similar also to FIGS. 2 and 3 respectively, and show a third form of the invention. And, FIGS. 12 and 13 are detailed fragmentary views taken as indicated by lines 12–12 and 13–13 on FIGS. 10 and 11 respectively.

The synchronized jaw clutch C of the present invention is primarily useful in geared transmissions and the like wherein one rotating element is driveably disengageable with another. A portion of a typical transmission of the type under consideration is shown in the drawings and which involves generally a housing H, a drive shaft and clutch assembly X, a driven shaft assembly Y and a clutch control assembly Z that determines rotation of gears $G_1$ and $G_2$ carried by the shaft assemblies X and Y respectively. As shown, there is a drive shaft A and a driven shaft B both of which are straight shafts, the drive gear $G_1$ of assembly X being coaxially journaled over the shaft A. In addition to the drive shaft A, the drive shaft and clutch assembly X carries the principal elements of the synchronized jaw clutch C, the primary gear, and all antifriction bearings, spacers, retainers and fasteners effecting an assembled condition as a unit, as will later be described. The two assemblies X and Y are embraced by housing sections of longitudinally split half-shell configuration and which also carries the clutch control assembly Z that cooperates with the synchronized jaw clutch C carried with said assembly X.

The housing H is a longitudinally split half shell case that establishes the frame of the transmission, preferably formed as by casting a pair of mating half shell sections. For example, a typical power plant installation involves a prime mover disposed on a substantially horizontal axis coincidental with the drive shaft A axis, in which case the driven shaft B axis is laterally offset as shown. It is to be understood that the installation and transmission construction can vary to suit circumstances, and that this disclosure is restricted to that portion of the housing H and shaft assembly X which involves the synchronized jaw clutch C.

The half-shell housing H is split in a vertical plane coincidental with the axes of the two bores therein that carry the assemblies X and Y respectively. There is a bore 12 through the housing to carry the drive shaft assembly X and comprised of a shouldered opening 13 in the rear wall 14 of the housing and a through opening 15 in the front wall 16 of the housing. And there is a lower bore (not shown) through the housing to carry the driven shaft assembly Y. The drive shaft A enters the housing H through the shouldered openings 13, the assembly X including a retainer that closes the said opening with a seal surrounding the shaft. The through opening 15 is closed by a cover plate 20 establishing a closed chamber within the housing and the mating elements of the housing H are coupled by means of transverse fasteners 22, and the bearing retainer and cover plate 20 are then coupled to the half shell assembly by means of longitudinal fasteners 23, preferably capscrews threaded into the walls 14 and 16.

The drive shaft A in its drive shaft and clutch assembly X is combined as a unit with the primary drive gear $G_1$ and its supporting bearings 26 and 27, with the jaw clutch elements 25 and 28, with a retainer 29 and a seal S, with a coupling 30, with a locknut 31, spacer rings 32 and 33 and with a fastener 34. And in accordance with the invention, the drive gear $G_1$ has a hub 35 integrally incorporating the jaw clutch element 25 and telescopically engaged over drive shaft A and journaled concentrically thereon by means of antifriction bearings 36, preferably spaced roller or needle bearings adapted to accurately center gear $G_1$ with shaft A and to absorb radial thrust. Normally therefore, the gear $G_1$ is free to revolve on shaft A, the gear and shaft having spaced cylindrical bearing surfaces 37 and 38 between which the needles of bearings 36 are longitudinally disposed. The gear $G_1$ and its hub 35 are integral and off sufficient axial extent to establish stability of these tow elements with the needle bearing support therebetween.

The drive shaft A is suitable stepped as shown, and the above-mentioned elements installed thereon and secured in assembled condition, with the primary drive gear $G_1$ journaled thereon intermediate the bearings 26 and 27 and with the jaw clutch element 28 carried on a splined portion of the shaft next adjacent to the drive gear $G_1$ and opposed to the jaw clutch element 25 on said gear hub. As illustrated, the jaw clutch element 28 is axially shiftable on splines 51 as controlled by the means Z, to be driven by the shaft A and to disengageably drive the gear $G_1$. Generally, the jaw clutch elements involve circumferentially spaced axially projecting drive dogs for mating interengagement when brought together, and to the end that the gear $G_1$ can be torsionally connected or disconnected from shaft A.

In accordance with this invention, the jaw clutch C involves the two jaw clutch elements 25 and 28 which are characterized by axially projecting drive dogs 54 and 55 extending from axially opposed faces 41 and 53 in planes normal to the shaft axis. There is at least one dog 54 and 55 on each element 25 and 28 respectively, and it is preferred in practice to employ a plurality of dogs on each element in order to establish symmetry and balance. For example, in the three illustrated preferred forms of this invention there are six dogs on each jaw clutch element, however it is to be understood that this number of mating dogs can vary from one each to as many as circumstances require, depending upon operational requirements. In any case however, the mating dogs 54 and 55 alternately interengage so as to establish substantial circumferential continuity with minimized radial interstices therebetween, thereby minimizing angular displacement play. Characteristically therefore, each dog comprises an outer periphery 60, an inner periphery 61, an axially disposed face 62 and oppositely disposed driving faces 63 and 64. The outer 62 and inner peripheries 60 and 61 are concentric with all dogs, and the faces 62 are spaced equally from the opposing faces 41 and 53 except as hereinafter described, and the driving faces 63 and 64 are in planes that intersect the rotational axis.

The above-described dogs 54 and/or 55 are modified according to the present invention, that is at least one dog is modified, and preferably at least one dog of each jaw clutch element 25 and 28 is modified. The modification referred to is best illustrated in FIGS. 4 and 5 wherein the axially disposed face 62 is cam-shaped so as to present helically disposed inclined planes when observed with respect to the axis of rotation. In practice it is sufficient to crown the face 62 convexly when viewed radially on a line normal to the axis of rotation, in which case there are in effect two opposite and merging helixes that join at said line. It is preferred that said inclinations be rounded and merged at a radially disposed high point intersecting the rotational axis at a normal angle, with a shoulder edge 65 offset toward the face 41 or 53 as the case may be. In practice, the curvature of face 62 can be frustoconical or semicylindrical, and a practical formation is the latter which is shown throughout the drawings. Therefore, the modified dog faces 62 are shown as partial or semicylindrical curvatures disposed on radial axes intersecting the axis of rotation. Further in practice a practical offset of the shoulder edge 65 is .020 inch when the nominal outside diameter of the clutch dogs is 2.8 inch, in which case the cylindrical curvature of face 62 above referred to is formed, for example, on a 2.5 inch radius.

Referring now to the self-locking interengagement of the clutch elements 25 and 28, oppositely disposed driving faces 63 and 64 are angularly disposed with respect to the faces 41 and 53 and face 62, acutely in each instance. Thus, the faces 63 and 64 are overlying or undercut, as shown, to have a hooked engagement against axial separation when torque is applied on the rotational axis in either direction. In practice, a practical acute angle of face 63 and 64 to the opposed clutch element faces 41 and 53 is 85°, this angle being uniformly applied throughout the driving faces of all of the dogs involved.

The clutch control assembly Z is provided to position the clutch element 28, to slide it on the splines at 51 into and out of engagement with the clutch element 25. In accordance with the invention, the housing is provided with aligned bores or sleeves 80 and 81 in the front and rear walls 16 and 14 of the drive housing, on an axis laterally offset from the axis of the drive shaft A. Generally, the assembly Z comprises a shifting rod 82 slideably engaged through said bores 80—81, a shifting fork or clevis 83 embracing the element 28 and confined to an annular channel 52 at the backside thereof, and a detent means 84 to position the shifting rod 82. The clevis 83 is fixed to the rod 82 to move therewith and the rod is indented at two positions, one for clutch engagement and the other for clutch disengagement as shown, in order to be held positioned thereat by a spring-loaded ball of the detent means 84.

Referring now to the first form of the invention illustrated in FIGS. 1 through 5, each jaw clutch element 25 and 28 has six equally spaced circumferentially separated dogs 54 and 55 respectively. In practice, the angular separation in each dog of the opposite faces 63 and 64 is 28° while the angular separation of said faces between sequential dogs is 32°, and to this extent there is substantial angular displacement for some relative rotational movement between the interengaging clutch elements. In the form of synchronized jaw clutch now under consideration the dogs 54 and 55 are alternately modified as above described with a stepped modification to the dogs alternately therebetween. That is, every other or three of the dogs 54 and 55 are modified as above described while every other or three dogs 54 and 55 therebetween are stepped. Specifically, the intermediate stepped dogs have faces 62' offset axially toward the faces 53 and 41, to be disposed axially away from the high point of the merging curvature on the first described modified dogs. In practice, the axial offset of face 62' can be and is preferably the same 0.020 inch as the offset of shoulder edge 65. And, the face 62' can be flat as shown. As a result of this alternating modification of dogs 54 and 55, an angular displacement of 120° occurs between the dogs 54 and 55 of highest axial extent with axial clearance therebetween to pass over the offset faces 62' of the intermediate dogs in order to be accelerated axially and thereby moved into ultimate positive engagement with each other. This clutch arrangement is reversibly operable and works equally well in either direction of rotation.

With the clutch element configuration hereinabove described, the first described modified and cam-shaped dogs are frictionally engageable when the angular velocities of the jaw clutch elements 25 and 28 are at variance with each other. When said angular velocity differential is great, only the radially disposed high points of the dogs strike to have said frictional engagement, and which accelerates for example the element 25 toward rotational accordance or synchronization with the speed of element 28. As said rotational accordance or synchronization is approached the helical inclined shape of the cam-shaped dog faces 62 permits deepening offset movement of the opposed engagement points of the dogs, and which increasingly accelerates the element 25 toward close synchronization, accompanied by a corresponding reciprocating axial movement of the element 28 as it is pressured toward the element 25 by the means Z. As said rotational accordance or synchronization is closely approached as a result of the foregoing, the frictional interfacial engagement of the opposed cam faces 62 becomes increasingly inclined as a result of the cylindrical curvature, and which permits increasingly deepening offset movement of the opposed engagement points of the dogs closer to the shoulder edges 65 thereof, and which brings the two elements 25 and 28 into near rotational accordance ro synchronization following which further rotational displacement at a relatively low rate is conducive to a final self-locking interengagement of the jaw clutch elements 25 and 28 induced by the angularly disposed faces 63 and 64. Thus, it is the practice to apply axial pressure between the opposed cam-shaped dogs 54 and 55 until sufficient synchronization is reached, whereupon a final axial movement causes a positive interengagement to occur, and which is accomplished without clashing.

Referring now to the second form illustrated in FIGS. 6 through 9, each jaw clutch element 25' and 28' has six equally spaced circumferentially separated dogs 54 and 55, two of which are cam-shaped and modified as first described. And, in this form said cam-shaped dogs 62 are therefore diametrically positioned with two groups of stepped dogs with sequentially deepening faces 62' and 62''. As best illustrated in FIGS. 8 and 9 the faces 62' and 62'' are successively deepened as above described so as to increase the axial acceleration time, by establishing increased arcuate distance between cam-shaped dogs 62, as compared with said first form. As a result of this stepped group configuration, an angular displacement 180° occurs between the dogs 54 and 55 for their interengaging movements as above described, and best performed when rotation is in the direction indicated by the arrows in FIGS. 8 and 9.

Referring now to the third form of the invention illustrated in FIGS. 10 through 13, each jaw clutch element 25'' and 28'' has six equally spaced circumferentially separated dogs 54 and 55, all of which are cam-shaped dogs 62 modified as first described. As a result of this strictly sequential arrangement of frictionally engageable dogs, an angular displacement of 60° occurs between the dogs 54 and 55 for their interengaging movements as described in connection with the first form. In this case the clutch functions equally well in both directions of rotation, however the axial acceleration time is reduced as a result of the limited arcuate distance between the dogs, when compared with said first form.

From the foregoing it will be clear that a dual engagement jaw clutch is provided, wherein frictional engagement is first accomplished through the striking together of the opposed cam-shaped dogs, and the effect of which is increasingly promulgated through the application of axial pressures followed by near rotational accordance or synchronization that permits the finally induced interlocking of the dogs of the jaw clutch elements, and all without clashing thereof due to the acceleration effect of said increasingly effective frictional engagement. Disengagement is effected through the axial withdrawal of the jaw clutch elements one from the other, and which is to be promoted by relaxing of the torque applied in order to facilitate release of the hookedly engaged dogs.

Having described only typical preferred forms and applications of my invention, I do not wish to be limited or restricted to the specific details herein set forth, but wish to reserve to myself any modifications or variations that may appear to those skilled in the art:

I claim:

1. A jaw clutch comprised of two axially opposed and disengageable clutch elements that are firstly frictionally engaged and the angular velocities thereof synchronized momentarily before secondly shifting into positive interengagement, and including, an interfacially engageable dog projecting axially from an axially disposed face on each clutch element and spaced equally from a common rotational axis to revolve through interengageable paths, said dogs of the two clutch elements being complementary for interfitted engagement and each having a radially and longitudinally disposed drive face opposed to a drive face of the other element, each of said dogs of the two clutch elements having an axially disposed friction face extending rotationally away from said drive face thereof, each of said friction faces having a circumferential inclination with respect to the direction of rotation extending away from its associated drive face, there being means firstly to axially shift the two clutch elements into frictional engagement of said friction faces when angular velocity is at variance therebetween and secondly to axially shift the two clutch elements further into positive interengagement of said drive faces when angular velocity therebetween is synchronized.

2. The synchronized jaw clutch as set forth in claim 1 and wherein the said inclined friction faces are convexly curved as they extend circumferentially.

3. The synchronized jaw clutch as set forth in claim 1 and wherein the friction faces of both complementary dogs are convexly inclined circumferentially with respect to the direction of rotation as they extend away from each drive face respectively.

4. The synchronized jaw clutch as set forth in claim 1 and wherein the friction faces of both complementary dogs are each semicylindrically formed on an axis disposed normal to the rotational axis, and inclined circumferentially with respect to the direction of rotation as they extend rotationally away from the drive faces respectively.

5. A jaw clutch comprised of two axially opposed and disengageable clutch elements that are firstly frictionally engaged and the angular velocities thereof synchronized momentarily before secondly shifting into positive interengagement, and including, a circumferentially disposed series of interfacially engageable dogs projecting axially from an axially disposed face on each clutch element and spaced equally from a common rotational axis to revolve through interengageable paths, said dogs of the two clutch elements being complementary for interfitted engagement and each having a radially and longitudinally disposed drive face opposed to the other, at least one dog of each of the two clutch elements having an axially disposed friction face extending rotationally away from said drive face thereof and each of said dogs having a friction face having a circumferential inclination with respect to the direction of rotation extending away from its associated drive face, and at least one dog following each of the first mentioned dogs and having an offset friction face disposed in a plane axially away from the said first mentioned friction face of the first mentioned dog and toward the first mentioned axially disposed face of the clutch element, there being means firstly to axially shift the two clutch elements into frictional engagement of said friction faces when angular velocity is at variance therebetween and secondly to axially shift the two clutch elements further into positive interengagement of said drive faces when angular velocity therebetween is synchronized.

6. The synchronized jaw clutch as set forth in claim 5 and wherein the said dog of each clutch element following the first mentioned dog with the inclined friction face has a flat offset friction face disposed in a radial and circumferentially disposed plane.

7. The synchronized jaw clutch as set forth in claim 5 and wherein the friction faces of the dogs are alternately inclined friction faces and offset friction faces.

8. The synchronized jaw clutch as set forth in claim 5 and wherein the friction faces of the dogs are alternately inclined friction faces and flat offset friction faces.

9. The synchronized jaw clutch as set forth in claim 5 and wherein there is a plurality of said dogs following the dog with the inclined friction face and each with an offset friction face further offset toward the first mentioned axially disposed face of the clutch element with each sequential position of the dog placement rotationally away from the proceeding dog with the inclined friction face.

10. A reversible jaw clutch comprised of two axially opposed and disengageable clutch elements that are firstly frictionally engaged and the angular velocities thereof synchronized momentarily before secondly shifting into positive interengagement, and including, a circumferentially disposed series of interfacially engageable dogs projecting axially from an axially disposed face on each clutch element and spaced equally from a common rotational axis to revolve through interengageable paths, said dogs of the two clutch elements being complementary for interfitted engagement and each having circumferentially oppositely faced radially and longitudinally disposed drive faces for opposed and positive engagement between the two elements, at least one dog of each of the two clutch elements having an axially disposed friction faces extending between the drive faces thereof, at least one of said friction faces being convexly raised as it extends between the drive faces to present a circumferentially inclination extending away from each drive face of the lug, and at least one dog following each of the first-mentioned dogs and having an offset friction face disposed in a plane axially away from the said first-mentioned friction face of the first-mentioned dog and toward the first-mentioned axially disposed face of the clutch element, there being means firstly to axially shift the two clutch elements into frictional engagement of said friction faces when angular velocity is at variance therebetween and secondly to axially shift the two clutch elements further into positive interengagement of said drive faces when angular velocity therebetween is synchronized.

11. The reversible synchronized jaw clutch as set forth in claim 10 and wherein the said convexly raised friction faces are semicylindrically formed on an axis inclined normal to the rotational axis.

12. A transmission drive shaft having two axially opposed and disengageable clutch elements that are firstly frictionally engaged and the angular velocities thereof synchronized momentarily before secondly shifting into positive interengagement, one clutch element being the drive element and having axially shiftable splined engagement on the drive shaft, and the other clutch element being the driven element and having journaled engagement over the drive shaft to revolve concentrically therewith, and including an interfacially engageable axially projecting dog on each clutch element and spaced equally from the drive shaft axis to revolve through interengageable paths, said dogs of the two clutch elements being complementary for interfitted engagement and each having a radially and longitudinally disposed drive face opposed to a drive face of the other element, each of said dogs of the two clutch elements having an axially disposed friction face extending rotationally away from said drive face thereof, each of said friction faces having a circumferential inclination with respect to the direction of rotation extending away from its associated drive face, there being means firstly to axially shift the said one clutch element into engagement with said other clutch element for frictional engagement of said friction faces when angular velocity is at variance therebetween and secondly to axially shift the two clutch elements further into positive interengagement of said drive faces when angular velocity therebetween is synchronized.

13. The transmission shaft with synchronized jaw clutch as set forth in claim 12 and wherein the said inclined friction faces are convexly curved as they extend circumferentially.

14. The transmission shaft with synchronized jaw clutch as set forth in claim 12 and wherein the friction faces of both complementary dogs are convexly inclined circumferentially with respect to the direction of rotation as they extend away from each drive face respectively.

15. The transmission shaft with synchronized jaw clutch as set forth in claim 12 and wherein the friction faces of both complementary dogs are each semicylindrically formed on an axis disposed normal to the rotational axis, and inclined circumferentially with respect to the direction of rotation as they extend rotationally away from the drive faces respectively.